Nov. 18, 1941.  F. B. ALLEN  2,263,433

METHOD OF AND APPARATUS FOR FURNACE DUST HANDLING AND DISPOSAL

Filed May 3, 1939  3 Sheets-Sheet 1

INVENTOR.
FRANK B. ALLEN
BY
Richey & Watts
ATTORNEYS

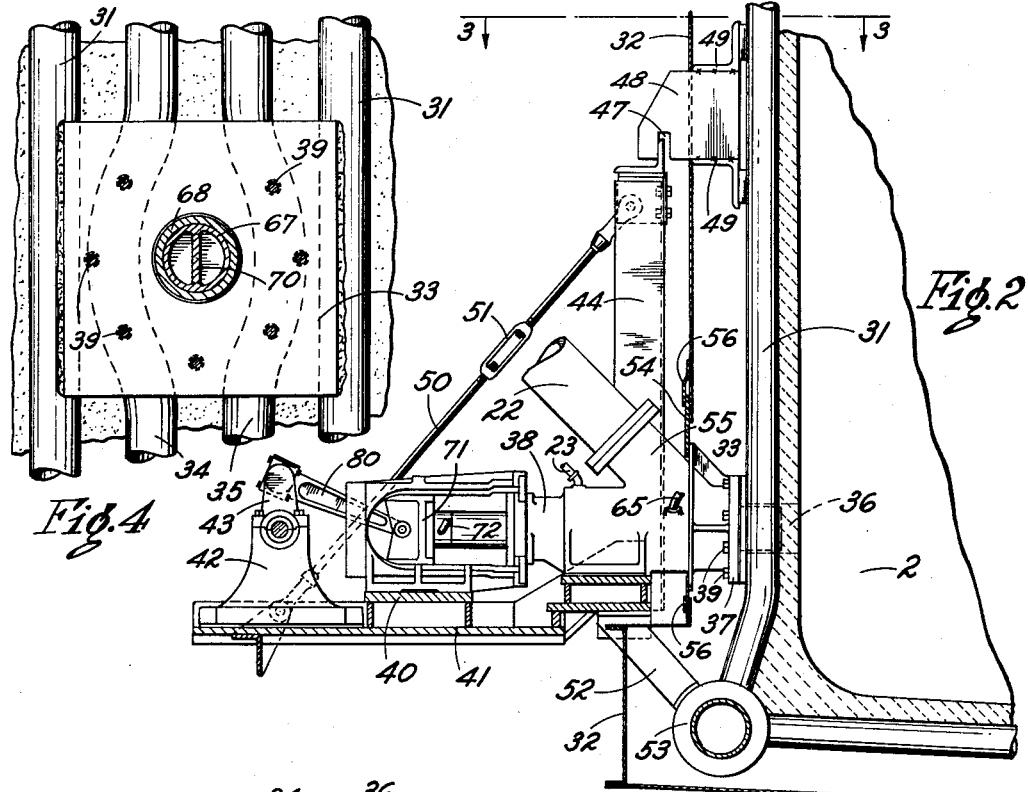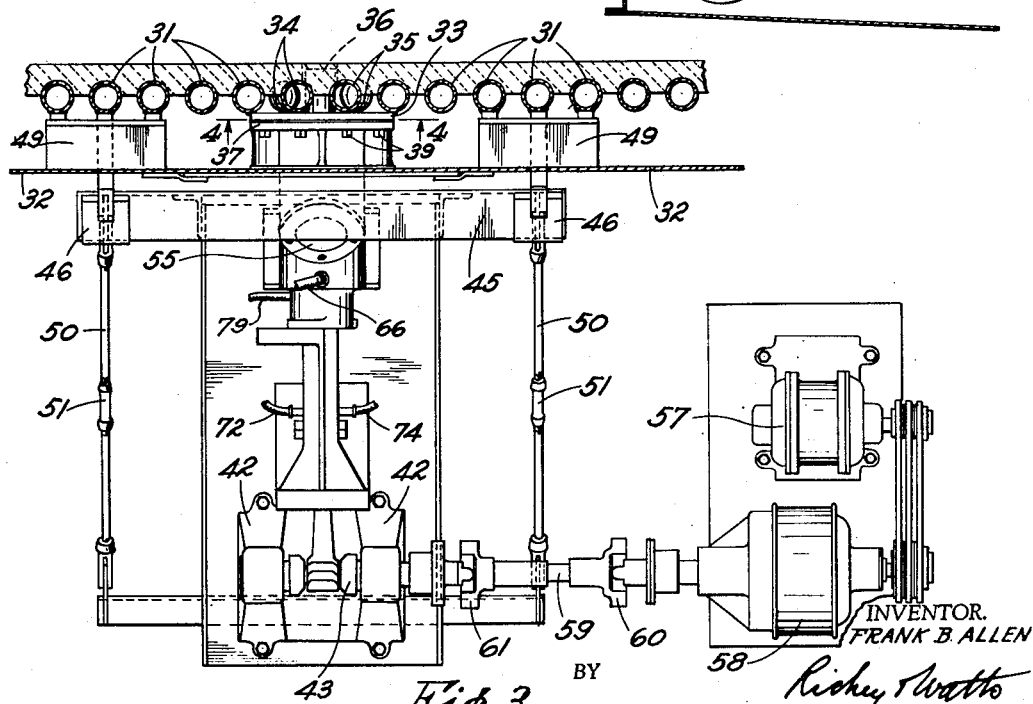

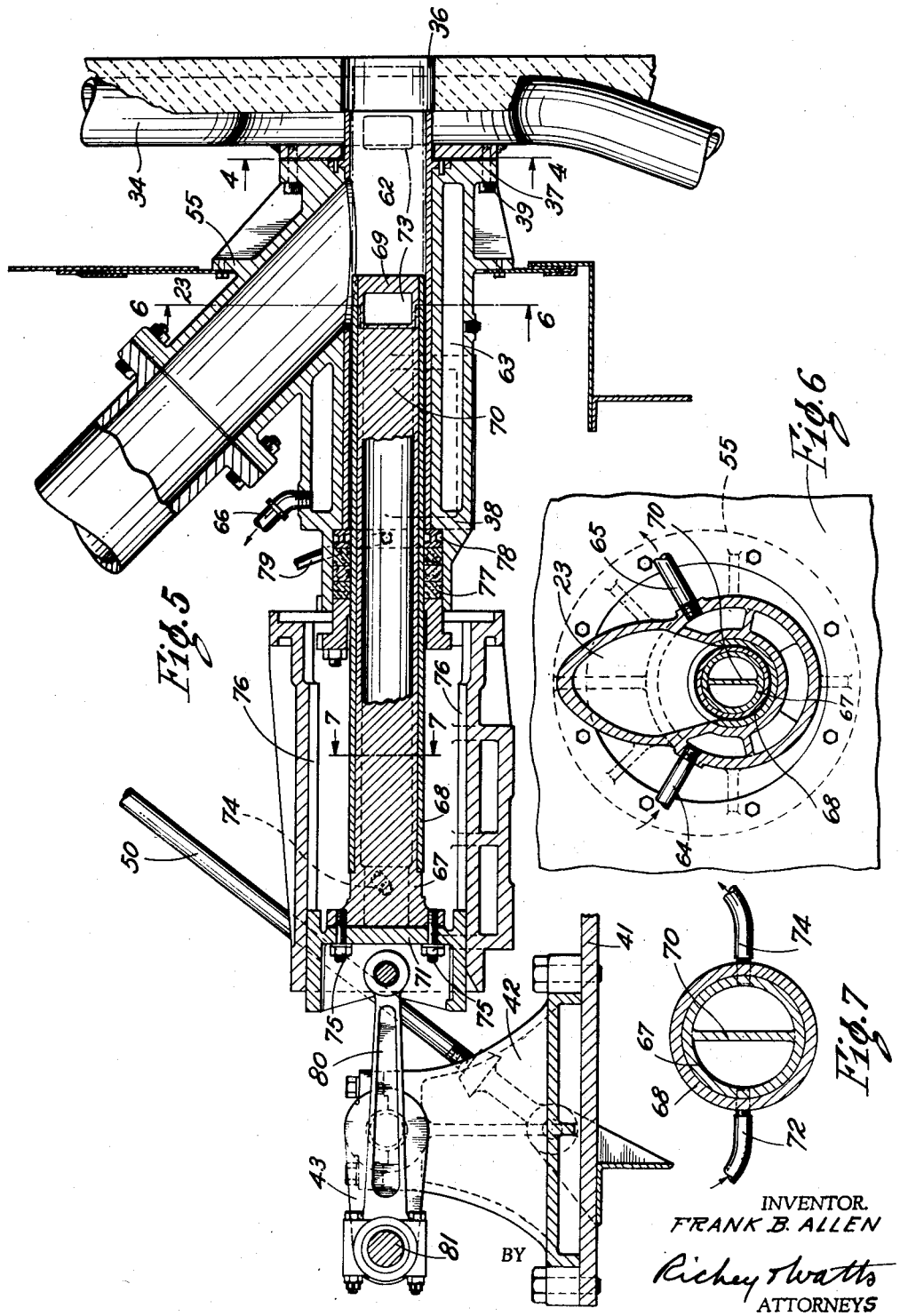

Patented Nov. 18, 1941

2,263,433

UNITED STATES PATENT OFFICE 2,263,433

METHOD OF AND APPARATUS FOR FURNACE DUST HANDLING AND DISPOSAL

Frank B. Allen, Lower Merion Township, Montgomery County, Pa., assignor to The Allen-Sherman-Hoff Company, Philadelphia, Pa., a corporation of Pennsylvania Application May 3, 1939, Serial No. 271,549

12 Claims. (Cl. 110—165)

This invention relates to methods and apparatus for handling and disposing of finely divided dust and the like and more particularly to an improved furnace dust handling equipment and method whereby the dust may be converted from a product which constitutes a serious nuisance into a material of commercial value.

In the operation of boiler furnaces the collection and disposal of the very fine dust which results during the combustion of the fuel has been a serious problem. This dust is so fine and light that it is entrained with the gases passing through the boiler and may be carried out of the stack to be spread around the country side. It is customary in furnace construction to provide dust collecting bins in the last passes of the furnace where some of this dust may settle out, and also electrical precipitators have been installed in the flues leading to the stack or in the stack itself. Effective removal of the dust from the gases may be accomplished by such means but after the dust has been separated from the gas, the problem remains of disposing of the dust.

It is hard to find a suitable place to dump the dust, which has no value whatever, because, if it is handled wet it freezes in winter and if it is handled dry it is picked up by the wind and blown around with resulting damage to adjacent property.

In so-called "wet bottom" furnaces (that is, furnaces wherein the ashes are allowed to slag in the furnace and are removed from the furnace in molten condition) the molten ash or slag is quenched in water and disintegrated to form small particles of hard, clean material which make excellent track ballast for railroads or other similar uses and which product is much in demand.

An object of my present invention is to provide means for converting extremely fine furnace dust into a useful and salable granulated slag product with the accompanying elimination of the problem of disposing of the dust which is removed from the furnace. Other objects of my invention are: to provide means for conveying dust from one or more locations where it is collected to a point adjacent the wet bottom of a furnace and re-introducing the dust into the furnace in such a manner that it is not picked up by the furnace draft and again carried up through the tubes and flues; to provide an improved dust collecting system combined with an improved ram for forcing the collected dust into the furnace; to provide an improved dust ram and support therefor whereby the normal expansion and contraction of the furnace will not affect the operation of the ram; to provide an economical and effective method of handling and disposing of fine furnace dust from wet bottom furnaces; and to provide simple, rugged apparatus for collecting and reintroducing dust into a wet bottom furnace whereby the dust will mingle with the molten ash or slag, be melted down into fluid condition and be removed from the furnace as an easily handled and salable slag product.

The above and other objects of my invention will appear from the following description of one embodiment of my improved apparatus for carrying out my method, reference being had to the accompanying drawings, in which—

Figure 2 is an enlarged detached side elevation of my dust ram and its mounting on the furnace.

Figure 3 is a plan view taken substantially on line 3—3 of Figure 2.

Figure 4 is an enlarged fragmentary vertical cross-sectional view taken on line 4—4 of Figure 3.

Figure 5 is an enlarged vertical cross-sectional view of my water cooled dust ram.

Figure 6 is a vertical cross-sectional view taken on line 6—6 of Figure 5.

Figure 7 is a vertical cross-sectional view taken on line 7—7 of Figure 5.

Figure 1:
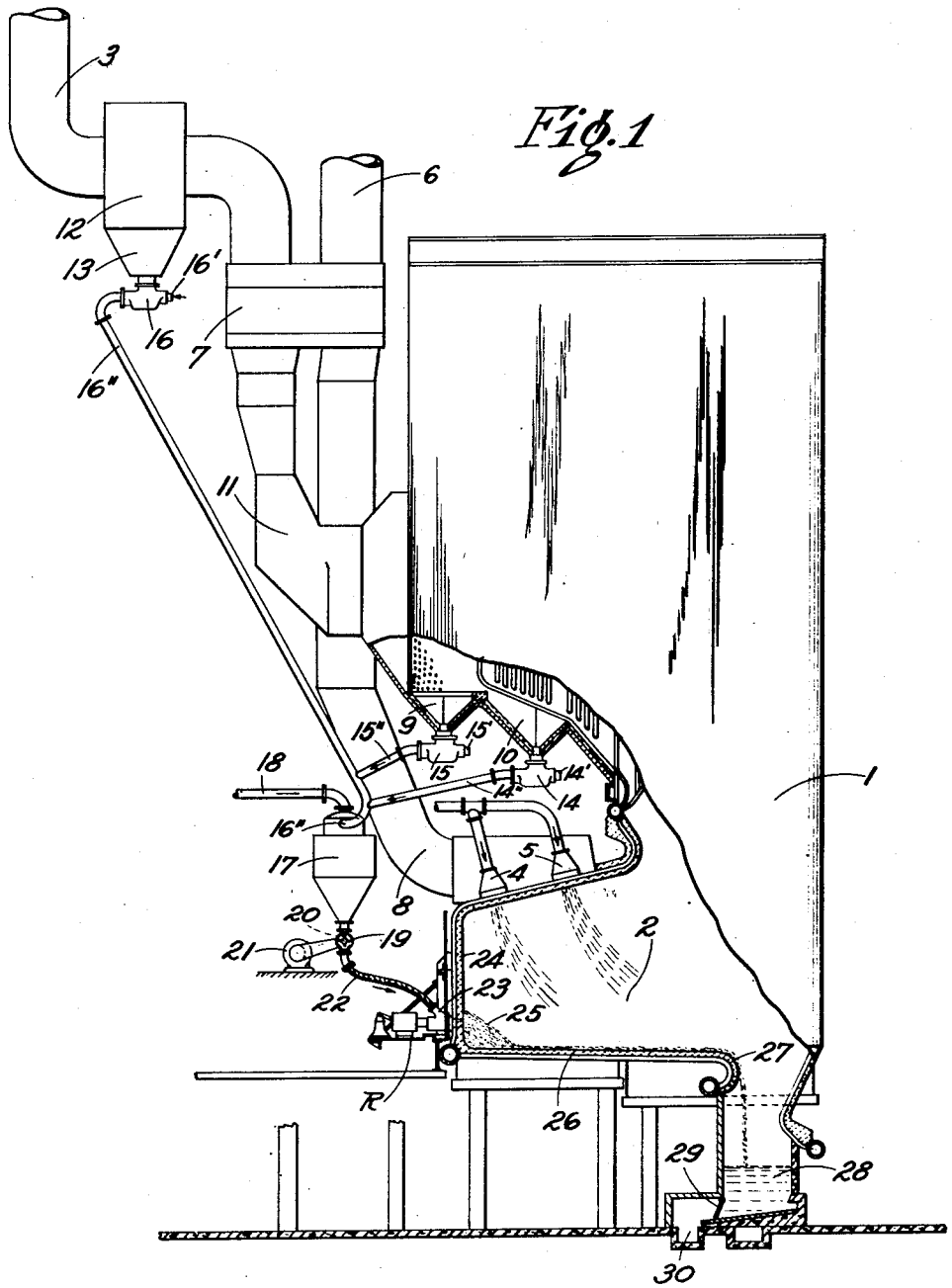
Figure 1 is a diagrammatic side elevation, partly in section, of a wet bottom furnace equipped with my dust handling apparatus.

Figure 1 shows the general layout of my dust handling system applied to a powdered fuel burning boiler furnace. The shell of the furnace is indicated at 1, the combustion chamber at 2, and the stack outlet for the products of combustion at 3. The powdered coal fuel is mixed with air and discharged into the combustion chamber 2 through the burners 4 and 5, the air supply entering through the pipe 6, passing through an air preheater 7 and being conducted to the burners 4 and 5 through suitable conduits and connections 8. Combustion takes place in the furnace in the usual manner and the gaseous products of combustion move up through the shell 1 and pass out over the dust bins 9 and 10 into the flue 11 which leads to an electrical precipitator unit diagrammatically shown at 12. This precipitator unit has a dust collecting bottom hopper 13.

As the products of combustion pass through the furnace to the stack part of the dust entrained therein is collected in the dust bins 9 and 10 and a large percentage of the remaining dust may be removed in the precipitator 12 and collected in the precipitator hopper 13. Each of the hoppers or bins 9, 10 and 13 is provided with a bottom outlet opening which discharges dust into the wind swept dust valves 14, 15 and 16. These valves are not shown in detail but are preferably of the type described and claimed in my United States Letters Patent No. 1,943,780, issued January 16, 1934.

In the operation of these dust valves air is caused to enter the inlet pipes 14', 15' and 16' by suction applied on the outlet pipes 14", 15" and 16", as will be later explained. Thus, a draft of air is caused to flow through the valve bodies 14, 15 and 16 which picks up and entrains the dust which drops into the valves from their respective hoppers. The pipe 16" extends to the top of the vacuum dust collector tank 17 and the outlet pipes 14" and 15" connect to the pipe 16" so that all of the dust and air is discharged through a single pipe into the dust collector and separator tank 17. The pipe 18 leads from the vacuum dust collector 17 to a suitable vacuum producer (not shown but may be of any desired type such as a hydraulically operated vacuum producer, or a power driven pump).

In the collector tank 17 the mixture of dust and air which enters through the pipe 16" is separated into dust which deposits in the bottom of the tank and relatively clean air which is withdrawn through the pipe 18. A feeder valve 19 is located at the bottom of the tank 17. This, in its simplest form, comprises a rotary feeder member having a plurality of blades 20 which may be driven by a motor 21. When the blades are rotated by the motor 21 dust will be removed from the bottom of the tank 17 and fed into the flexible conduit connection 22 but, due to the arrangement of the blades or vanes 20, a seal is maintained at all times which prevents the action of the vacuum in the tank 17 from creating a back suction in the pipe 22.

It will be seen that when the above described apparatus is in operation a lower than atmospheric pressure will be maintained in the tank 17, and the pipes 16", 15" and 14". This will cause air to enter the valves 14, 15 and 16 and withdraw dust from the hoppers 9, 10 and 13. The air inlets 14', 15' and 16' for the dust valves are preferably provided with suitable shut offs (not shown) so that if it is desired to permit dust to collect in any one of the hoppers the suction may be shut off so that there will be no tendency to withdraw dust from the hopper.

It will also be understood that the feeder valve 19 may be operated either intermittently or continuously as desired. The entire system may be operated only at intervals when a material amount of dust has collected in the hoppers. By merely shutting off the vacuum on the pipe 18 the withdrawal of dust from the hoppers will cease. After a certain period of time sufficient dust will again collect in the hoppers and the vacuum may again be applied through the pipe 18 to withdraw the dust from the hoppers and convey it into the collecting and separating tank 17.

The rotary feeder 19 acts to force the dust down into the flexible conduit 22 which extends to the inlet 23 of the feeder ram which is generally indicated in Figure 1 at R. The construction and operation of this ram will be explained later, but it will be seen from Figure 1 that it is disposed adjacent the bottom corner of the furnace combustion chamber 2 and has an opening through the furnace wall 24 into the combustion chamber.

When the ram is first placed in operation dust will be discharged into the lower corner of the combustion chamber 2 and will pile up as indicated at 25. As the outlet of the ram is located at a point in the combustion chamber where the air and gases are relatively quiescent the creation of this pile is facilitated. As the pile builds up the outer surface thereof will become at least partially molten, due to the heat of the combustion chamber, forming a protective crust on the pile which effectively prevents the entrainment of the dust by the furnace gases. As dust is continued to be fed into the furnace it enters below the surface of the pile on the under-feed principle and thus the fresh, finely divided dust is protected by the crust on the pile from being picked up and again carried out through the furnace structure. The heavier ash from the combustion drops onto the floor or bottom 26 of the furnace where it melts and runs off over the lip 27 into a pool of water 28 which chills and disintegrates the slag. The surface of the dust pile 25 continuously melts off and joins the molten ash on the furnace bottom 26 and thus is reduced to a commercially usable product along with the larger particles of ash which are sufficiently heavy to settle on the furnace bottom.

It will be understood that, although a pool of water is diagrammatically indicated at 28 for quenching the molten ash and dust, any suitable apparatus may be employed for solidifying the molten products of combustion, breaking them up into particles of the desired size, and removing them from the furnace. In the illustrated embodiment a gate 29 is adapted to maintain the pool of water 28 until a quantity of slag is deposited therein whereupon the gate 29 may be opened and the collected material and water removed through the sluiceway 30.

The dust ram R and its supporting and driving mechanisms are shown in detail in Figures 2 to 7. As the boiler tubes 31 contract and expand in the normal operation of the boiler they move relative to the boiler shell or casing 32. I have therefore provided a supporting mount for the dust ram whereby the ram will move with the boiler tubes and thus the feeding connection to the interior of the combustion chamber will always be maintained.

As is best seen in Figure 4, a plate 33 is welded to the outside of the tubes 31 of the boiler. A pair of adjacent tubes, 34 and 35, are each bent outwardly in order to provide a suitable opening 36 therebetween for forcing the dust into the furnace. The inner end 37 of the ram casing or housing 38 is secured to the plate 33 by screws 39 and the outer end of the casing 38 includes a base portion 40 which is supported upon a platform 41. The bearing blocks 42 for the ram driving crank 43 are also supported on the platform 41. Vertically extending posts or columns 44 extend upwardly from the inner edge of the platform 41 and are connected at their upper ends by a transversely extending cross angle 45. At the ends of the angle member 45 are latch members 46 which fit into slots 47 in the upper retaining members 48. These slotted members 48 extend through the boiler shell 32 and are welded or otherwise rigidly attached to the boiler tubes 31 through intermediate connecting members 49.

The load on the outer end of the platform 41 is carried to the upper end of the post 44 by tie rods 50 which preferably have turn buckles 51 for adjustment purposes. Additional supporting braces 52 extend from the underside of the inner edge of the platform 41, through the furnace casing 32, to the header 53. In order to seal the joint between the dust ram housing 38 and the casing 32, regardless of the movement of the tubes 31 and the ram structure relative to the casing, I provide a disc 54 which is secured to a flange 55 on the housing 38 and which overlaps the edges of the opening in the casing 32 through which the ram extends. Overlapping seal flanges 56 provide clearance for movement of the plate 55 in all directions relative to the casing 32 while effectively sealing the sliding joint thus formed.

The ram is driven by means of a motor 57 through a gear box 58 and a shaft 59 having flexible couplings 60 and 61 therein. This shaft is coupled to the shaft of the crank 43. The motor and gear box may be mounted on a rigid foundation, the couplings or universal joints 60 and 61 taking care of any variations in alignment due to movement of the platform 41 and the parts carried thereby during furnace operation.

It will be seen that in the above described support for the dust ram R the weight of the ram is carried entirely by the boiler tubes. The rigid connection of the ram to the boiler tubes through the plate 33 will not be disturbed by any movement of the tubes due to contraction and expansion in operation. The entire assembly of the ram and its supports moves in all directions with the tubes 31.

The construction of my improved dust ram structure is best seen in Figures 5, 6 and 7. The inlet passage 23 opens into the bore 62 of the ram housing 38 which is provided with water jackets 63, having water inlets 64 and 65 (see Fig. 6) and a water outlet 66, whereby overheating of the ram structure is prevented. The ram itself comprises an elongated member 67 having a tubular sleeve 68 fitting thereover and having a closed end 69. A dividing wall 70 (see Figs. 6 and 7) extends longitudinally of the ram from the cross-heel 71 to a point short of the closed end 69 of the ram. Cooling water is directed into the ram at the cross-head end on one side of the dividing wall 70 through the pipe 72 and flows longitudinally of the ram to the opening 73 in the inner end and then returns on the opposite side of the wall 70 and is withdrawn through the water outlet pipe 74. With this arrangement a positive circulation of cooling water for the entire length of the ram is obtained.

The cross-head 71 is secured to the end of the ram member 67 by bolts 75 and is supported by and moves in suitable slideways 76 in the housing or frame 38. The ram passes through a stuffing box 77 which maintains a sealed joint and prevents the escape of dust around the ram. Air under pressure is discharged into an annular sealing ring 78 through an air supply pipe 79. It will be seen from Figure 5 that the ram sleeve 68 has a relatively loose fit in the bore 62 of the casing 38. Therefore, the air which is applied through the conduit 79 will effectively prevent the passage of any dust into the stuffing box 77 thus eliminating abrasive wear of the ram.

The cross-head 71 is pivotally connected to the connecting rod 80 which has a suitable bearing on the crank pin 81 of the crank 83 and it will be evident that when the crank is rotated by the motor 57 a reciprocating movement will be imparted to the ram. In Figure 5 the ram is shown in full lines in its fully withdrawn position and in dot and dash lines in its forward position. As the dust is fed down through the inlet opening 23 it is forced by the ram through the opening 36 into the combustion chamber 2 of the furnace. When the ram is withdrawn additional dust moves down into the open end of the bore 62 and as the ram advances this dust is forced into the furnace beneath the surface of the pile of dust 25 which is established in the combustion chamber 2 of the furnace.

The apparatus described above is particularly adapted for carrying out my improved method of disposing of furnace dust which includes the steps of withdrawing and collecting the dust from the furnace structure, returning the dust to the combustion chamber of the furnace, maintaining a pile of dust in the combustion chamber having a crust-like surface formation whereby picking up or entraining of the dust is prevented, and permitting the dust to melt down from the surface of the pile and be removed from the furnace with the molten ash and slag. By mounting my dust ram so that it moves with the boiler tubes without placing any strains upon the boiler shell or casing, or other parts of the boiler structure, and by providing a flexible connection 22 from the dust collecting tank 17 to the ram, the normal expansion and contraction of the boiler tubes will not interfere in any way with the operation of my equipment. Very little energy is required to operate my entire dust disposal system. By my improved method and apparatus a serious and expensive nuisance in the operation of boiler furnaces has been converted into a productive method of making a salable material out of furnace dust.

Although I have described the illustrated embodiment of apparatus incorporating the features of my invention in considerable detail, it will be understood that different furnaces will require changes in the arrangement of parts. It will be further understood that numerous variations and modifications in the specific form of the apparatus employed for carrying out my method may be made without departing from the spirit of my invention. I do not, therefore, wish to be limited to the exact form or arrangement of apparatus herein shown and described or to the precise procedure herein outlined in describing the accompanying drawings, but claim as my invention all embodiments thereof coming within the scope of the appended claims.

I claim:

1. A method of disposing of furnace dust from wet bottom furnaces which includes the steps of separating dust from the furnace gases, withdrawing the separated dust from the furnace structure, reintroducing the withdrawn dust into a heated zone of the furnace and forming a pile of dust, continuing to feed dust into said pile below the surface thereof, melting dust at the surface of the pile, mingling the molten dust with molten furnace ash, and withdrawing and chilling the molten material.

2. A method of disposing of combustion furnace dust which includes the steps of separating dust out of the gases from the combustion chamber, reintroducing said dust into the furnace to form a pile in a zone where combustion occurs, subjecting the surface of the pile to heat to form a crust-like surface thereon, feeding additional dust into the pile below said crust-like surface, and melting down the surface of the pile and flowing the molten material from the pile of dust.

3. A method of disposing of furnace dust of the type described which includes the steps of creating a pile of said dust, subjecting the surface of said pile of dust to heat sufficient to form a crust thereon, feeding addtiional dust into said pile below said surface, reducing the surface of the pile to molten condition, and flowing the molten material to a place of disposal.

4. A method of disposing of furnace dust of the type described which includes the steps of creating a pile of said dust, subjecting the surface of said pile of dust to heat sufficient to form a crust thereon, feeding adidtional dust into said pile below said surface, reducing the surface of the pile to molten condition, flowing the molten material away from said pile, and chilling and disintegrating said molten material to form granulated slag.

5. In a wet bottom furnace having a combustion chamber and tubes in a wall thereof, means associated with the furnace structure for separating and collecting dust from the furnace combustion products, a reciprocating dust feeding ram supported by said wall tubes adjacent the bottom of said combustion chamber and having a discharge outlet into said combustion chamber adjacent the bottom thereof, means for conveying dust from said dust separating and collecting means to said ram, and dust conveying connections between said ram and said outlet into the combustion chamber of the furnace whereby dust may be deposited in a pile disposed upon the bottom of the combustion chamber and covering said discharge outlet.

6. In combination with a boiler furnace having a combustion chamber and wall tubes in the walls of said combustion chamber, a wet bottom for said combustion chamber, means for burning fuel in said chamber, means associated with the boiler furnace for separating and collecting dust from the products of combustion of the burning fuel, a dust ram supported by said wall tubes and having an outlet extending through the furnace wall into said combustion chamber adjacent said wet bottom, a dust conveying conduit connecting said ram and said dust separating and collecting means, and means for driving said ram.

7. In combination with a boiler furnace having a combustion chamber and wall tubes in the walls of said combustion chamber, a wet bottom for said combustion chamber, means for burning fuel in said chamber, means associated with the boiler furnace for separating and collecting dust from the products of combustion of the burning fuel, a dust collecting tank, means for conveying dust to said tank, a dust ram supported by said wall tubes and having an outlet extending through the furnace wall into said combustion chamber adjacent said wet bottom, a flexible dust conveying conduit connecting said ram and said tank, and means for driving said ram.

8. In combination with a furnace combustion chamber having wall tubes and a floor, a dust ram supported on said wall tubes and movable therewith, said ram being positioned to discharge dust into the combustion chamber in a pile on said floor, and means for conveying dust to said ram.

9. In combination with a boiler furnace having wall tubes, a dust ram having a housing rigidly secured at one end to said tubes, a frame for supporting said ram housing, and means secured to said tubes for supporting said frame.

10. In combination with a wet bottom furnace combustion chamber having side walls and a bottom, means for establishing a pile of furnace dust disposed in a corner between a wall and said bottom, said means being adapted, after said pile is established, to feed dust into said pile from below the exposed surface thereof, means for burning fuel in said combustion chamber whereby dust from the exposed surface of said pile will melt and mingle with molten products of combustion on said bottom, and means for cooling and disintegrating said molten material.

11. The method of handling furnace dust which includes the steps of forming a pile of such dust with an inclined top surface, successively removing the surface portion of the pile by continuously heating such surface portions to such a temperature that the dust thereof melts and flows away therefrom, and adding dust to the pile beneath its surface as the aforesaid melting and removal proceeds.

12. In a furnace having side walls, a wet bottom and fuel burners in the combustion chamber, mechanical means including a dust ram having an outlet opening through a side wall of the furnace near the wet bottom of the combustion chamber, said ram being so disposed as to form a pile of furnace dust in a corner of the combustion chamber between a side wall and the wet bottom with an inclined surface exposed to the heat of the burning fuel and to feed additional dust into said pile beneath the inclined surface thereof as the inclined surface portions of the pile melt and run away therefrom as a result of the heat applied thereto from the fuel burning in the combustion chamber.

FRANK B. ALLEN.